(12) United States Patent
Davis et al.

(10) Patent No.: US 6,401,208 B2
(45) Date of Patent: *Jun. 4, 2002

(54) METHOD FOR BIOS AUTHENTICATION PRIOR TO BIOS EXECUTION

(75) Inventors: Derek L. Davis, Phoenix; Pranav Mehta, Chandler, both of AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,147

(22) Filed: Jul. 17, 1998

(51) Int. Cl.[7] ................. H04L 9/32; G06F 12/14; G06F 11/30

(52) U.S. Cl. ............... 713/193; 713/189; 713/188; 713/187; 713/191

(58) Field of Search ............... 713/187–188, 713/189, 191, 193, 200

(56) References Cited

U.S. PATENT DOCUMENTS

| | | | |
|---|---|---|---|
| 5,022,077 A | | 6/1991 | Bealkowski et al. |
| 5,276,853 A | * | 1/1994 | Yamaguchi et al. ......... 711/131 |
| 5,421,006 A | * | 5/1995 | Jablon et al. ................ 714/36 |
| 5,444,850 A | * | 8/1995 | Chang ........................ 709/222 |
| 5,473,692 A | | 12/1995 | Davis |
| 5,539,828 A | | 7/1996 | Davis |
| 5,568,552 A | | 10/1996 | Davis |
| 5,796,840 A | | 8/1998 | Davis |
| 5,805,712 A | | 9/1998 | Davis |
| 5,828,753 A | | 10/1998 | Davis |
| 5,835,594 A | * | 11/1998 | Albrecht et al. ............ 713/187 |
| 5,844,986 A | * | 12/1998 | Davis ......................... 713/187 |
| 5,919,257 A | * | 7/1999 | Trostle ....................... 713/200 |
| 6,009,524 A | * | 12/1999 | Olarig et al. ............... 713/200 |
| 6,061,794 A | * | 5/2000 | Angelo et al. .............. 713/200 |

FOREIGN PATENT DOCUMENTS

WO    WO 98/15082    * 4/1998

OTHER PUBLICATIONS

Lynch, "CSC 277—Operating Systems," Jul. 2000, http://www.qvctc.commnet.edu/classes/csc277/bios.hml [internet].*

"Windows 2000 Professional Intel–based boot process," http://www.gateway.com/sup..roduct/software/win2000/750433034.shtml [internet]Jul. 2000.*

* cited by examiner

Primary Examiner—Albert Decady
Assistant Examiner—Steve Kabakoff
(74) Attorney, Agent, or Firm—Blakely, Sokoloff, Taylor & Zafman LLP

(57) ABSTRACT

A cryptographic device is implemented in communication with a host processor to prevent the host processor from performing a standard boot-up procedure until a basic input output system (BIOS) code is authenticated. This is accomplished by a cryptographic device which is addressed by the host processor during execution of a first instruction following a power-up reset. The cryptographic device includes a first integrated circuit (IC) device and a second IC device. The first IC device includes a memory to contain firmware and a root certification key. The second IC device includes logic circuitry to execute a software code to authenticate the BIOS code before permitting execution of the BIOS code by the host processor.

19 Claims, 5 Drawing Sheets

METHOD FOR BIOS AUTHENTICATION PRIOR TO BIOS EXECUTION

BACKGROUND

1. Field

The present invention relates to the field of data security. More particularly, this invention relates to a system and method for authenticating software code before execution by the host processor.

2. General Background

Over the last few years, computers have become products highly valued by consumers. The reason is that computers are highly versatile and enjoy a wide range of applications. Of major concern, however, is that computers, especially mobile computers such as laptops or hand-helds, are vulnerable to theft due to their commercial value and their exposure to insecure environments such as cars, hotel rooms and airport lobbies.

Currently, there exist a number of security mechanisms that are marginally effective. However, these mechanisms are still vulnerable to component or device replacement since no protected environment for execution of code and for manipulation of data is provided. For example, one type of conventional security mechanism involves the use of password software, which is normally executed after a host processor of the computer has been powered-up and has already fetched macro-instructions from Basic Input/Output System (BIOS) code residing in a Read Only Memory (ROM) device. The ROM device is physically separate from the host processor.

More specifically, during a normal power-on reset, a host processor of a conventional computer automatically jumps to a predetermined hardwired address. This address is a predetermined reset vector which is mapped to a ROM device containing the BIOS code. As a result, the host processor performs instruction fetches of BIOS code which usually prompts the computer to perform the following operations: (i) initialize its electronic hardware; (ii) initialize its peripheral devices; and (iii) boot its Operating System.

Unfortunately, the password-based security mechanism and other current security mechanisms can be easily circumvented. One way would be to replace the ROM device containing BIOS code with another memory device having a new, different BIOS code.

Additionally, due to the growing usage of networking solutions such as the Internet, computers are becoming more susceptible to invasive software virus attacks. Software viruses may be obtained during transactions over the Internet such as, for example, downloading data from either a website or an electronic bulletin board. For example, the software virus may include a program, infiltrating the BIOS code and executing in the background, that sends contents of hard disk drive over the Internet. Likewise, some of the software viruses are intended to damage the BIOS code which renders the computer inoperable.

These above-described scenarios further demonstrate the necessity in providing a protected environment for execution of code and for manipulation of data within a computer.

SUMMARY OF THE INVENTION

The present invention relates to processor in communication with a cryptographic device. The cryptographic device authenticates software code, loaded into the cryptographic device during a boot procedure, before permitting the host processor to execute the software code.

BRIEF DESCRIPTION OF THE DRAWINGS

The features and advantages of the present invention will become apparent from the following detailed description of the present invention in which.

DESCRIPTION OF AN EMBODIMENT OF THE INVENTION

The present invention relates to an electronic system and method for authenticating software code before execution by the host processor. Herein, certain examples of hardware and methods of operation are described in an illustrative sense, and should not be construed in a restrictive sense.

To clarify various qualities of the present invention, certain terminology set forth below is used to describe hardware or cryptographic-related terms. In particular, an "electronic system" is defined as any hardware with processing and internal data storage capability. Examples of electronic systems include computers (e.g., laptops, desktops, hand-held, servers, etc.), imaging equipment (e.g., printers, facsimile machines, scanners, etc.), wireless communication equipment (e.g., cellular phones, pagers, etc.), automated teller machines and the like. "Information" is defined as one or more bits of data, address, control or any combination thereof. A "bus" is any medium used to transfer information.

With respect to cryptography related terminology, a "key" is commonly defined as an encoding and/or decoding parameter. Normally, this parameter is a sequence of binary data such as (i) one or more public/private key pairs used by any public key cryptographic function (e.g., Rivest, Shamir and Adleman "RSA" related functions, Digital Signature Standard, Elliptic Curve, etc.) or (ii) a secret key shared in confidence between the two electronic systems executing any type of secret key cryptographic function (e.g., Data Encryption Standard). A "digital signature" includes digital information encrypted with a private key of its signatory to ensure that the digital information has not been illicitly modified after being digitally signed. This digital information may be provided in its entirety or as a digest produced by a one-way hash function. The "one-way hash function" includes a function, mathematical or otherwise, that converts information of a variable-length into information of a fixed-length (referred to as a "digest"). The term "one-way" indicates that there does not readily exist an inverse function to recover any discernible portion of the original information from the fixed-length digest. A "digital certificate" includes digital information used to authenticate a sender of information. For example, a digital certificate may include a public key of a person or entity being certified which is encrypted with the private key of a certification authority. Examples of a "certification authority" include an original equipment manufacturer (OEM), a software vendor, a trade association, a governmental entity, a bank or any other trusted entity.

Figure 1:
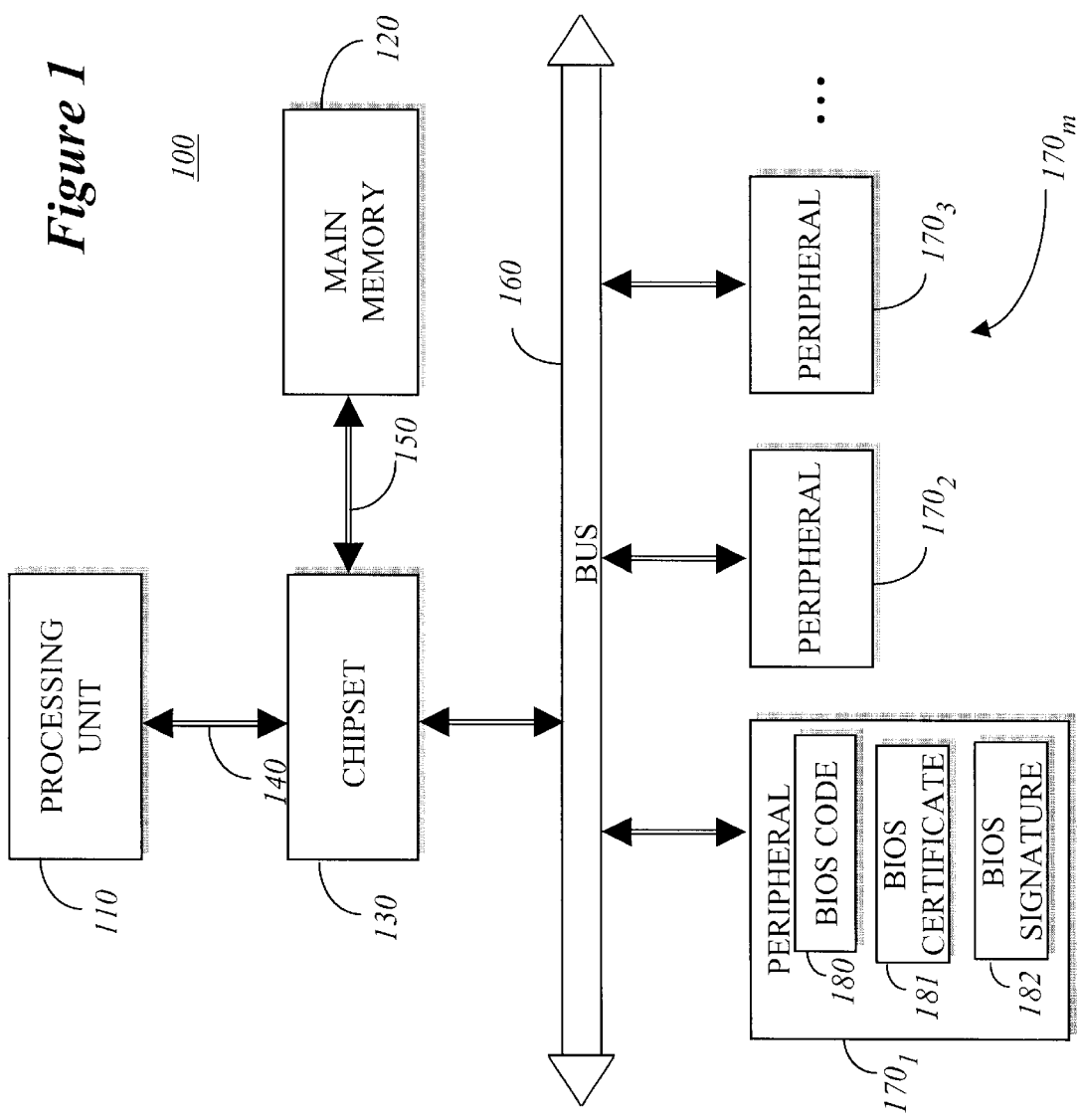
FIG. 1 is an illustrative embodiment of the electronic system practicing the present invention.

Referring to FIG. 1, an illustrative embodiment of an electronic system 100 employing the present invention is shown. Electronic system 100 comprises a processing unit 110 and a system memory 120 coupled together by a chipset 130. System memory 120 includes a volatile memory such as any type of random access memory. Chipset 130 operates as an interface between a plurality of buses, namely a host bus 140, a memory bus 150 and a bus 160.

Referring still to FIG. 1, bus 160 provides a communication path between (i) chipset 130 and (ii) one or more peripheral devices $170_m$ ("m" being a positive whole number). Bus 160 may be a multiplexed bus such as a Peripheral Component Interconnect (PCI) bus, an Industry Standard Architecture (ISA) bus or any other type of bus architecture. It is contemplated that bus 160 includes a single bus (e.g., a PCI bus) as shown, or alternatively, multiple buses coupled together through bridge circuitry. In the later illustrative example, each peripheral device $170_m$ would be coupled to at least one of the multiple buses.

As shown for illustrative purposes, the peripheral devices $170_m$ comprise a storage device $170_1$, a mass storage device $170_2$ (e.g., a hard disk drive, a CD ROM player, CD recordable player, digital tape drive, a floppy disk drive, a digital video disk "DVD" player, etc.) and/or a transceiver device $170_3$ (e.g., a network interface circuit card, a modem card, etc.). Storage device $170_1$ contains actual Basic Input/Output System (BIOS) code 180 for execution by processing unit 110 as well as a digital (BIOS) certificate 181 and a digital (BIOS) signature 182. BIOS signature 182 includes a digest of BIOS code 180 signed by a private key of the BIOS vendor for example. This digest is the resultant data after running the BIOS code through a one-way hash function. BIOS certificate 181 includes a public key of the BIOS vendor signed by a private key of the certification authority.

Figure 2:
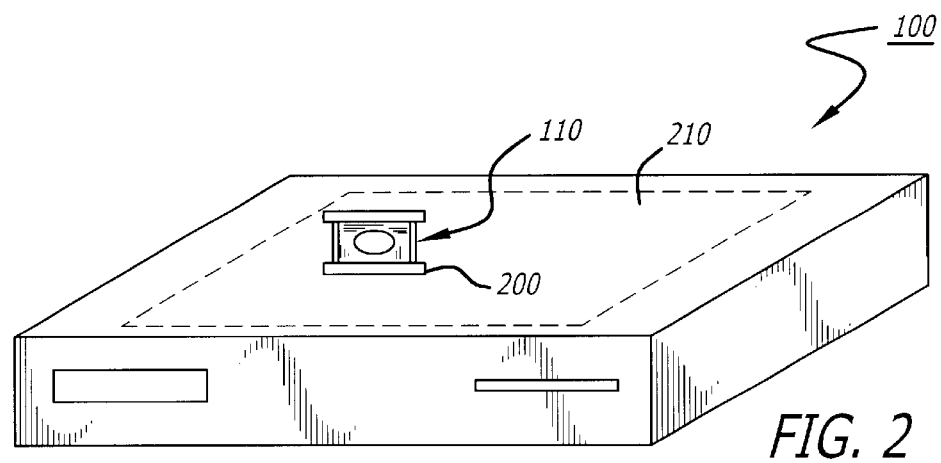
FIG. 2 is a more-detailed illustrative embodiment of the electronic system of FIG. 1.

Referring now to FIG. 2, one embodiment of processing unit 110 placed with electronic system 100 is shown. Processing unit 110 is connected to a connector 200 mounted on a system substrate 210 which is outlined by dashed lines. Controlling the overall functionality of electronic system 100, system substrate 210 typically is formed with any type of material or combination of materials upon which integrated circuit devices can be attached. Connector 200 enables communications between logic placed on system substrate 210 and processing unit 110. Any style for connector 200 may be used, provided a complementary connection is used by processing unit 110. Examples of connector 200 include, for example, a standard female edge connector (shown), a pin field connector or a socket attached to system substrate 210.

Figure 3:
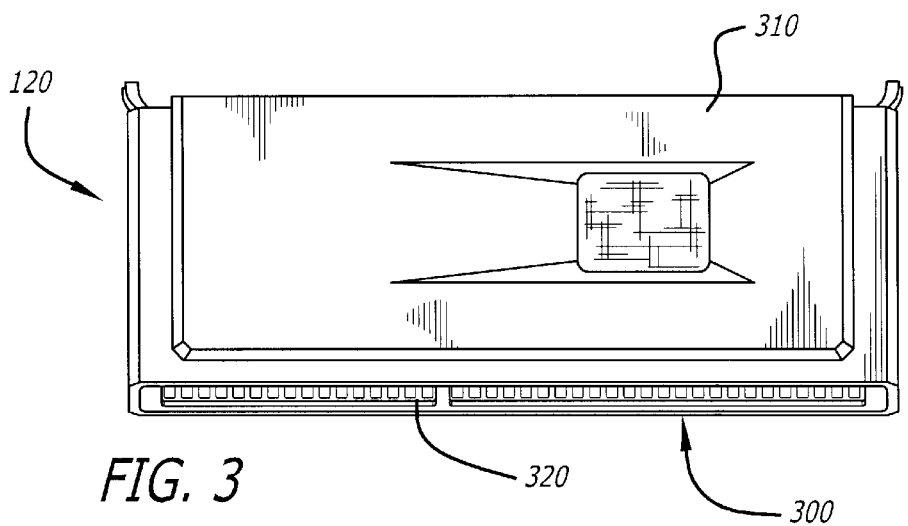
FIG. 3 is an illustrative embodiment of the processing unit of FIG. 2.

Referring now to FIG. 3, one illustrative embodiment of processing unit 110 features a processor substrate 300 formed from any type of material upon which integrated circuitry (not shown) can be attached through well-known techniques (e.g., solder connections, etc.). Processor substrate 300 is substantially covered by a package 310 in order to protect its integrated circuitry from damage or harmful contaminants. In this embodiment, processor substrate 300 includes a connector 320, which is adapted to establish a mechanical and an electrical connection with connector 200 of FIG. 2. Connector 320 includes a standard male edge connector.

Figure 4:
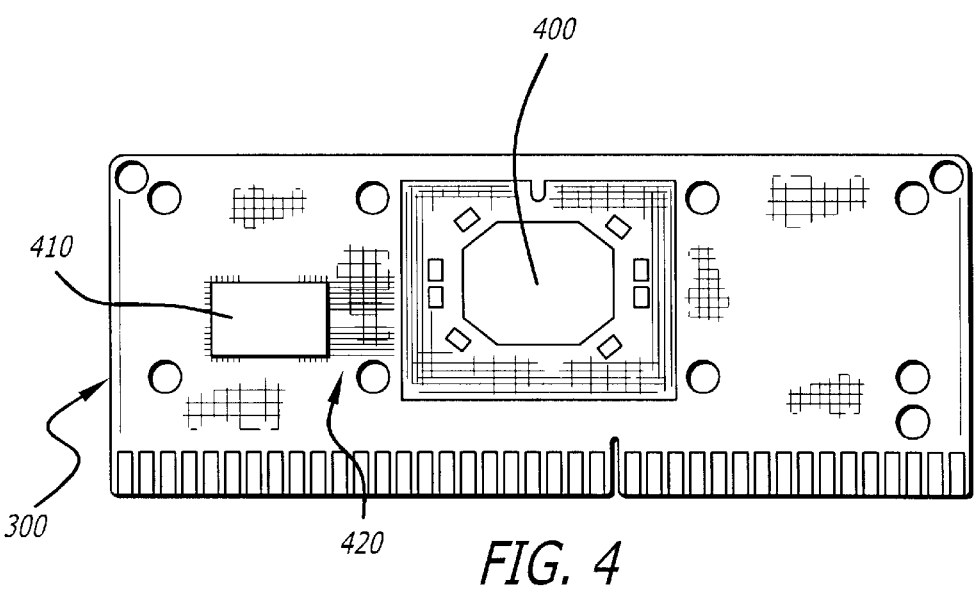
FIG. 4 is a more-detailed embodiment of the processing unit of FIG. 3.

Referring to FIG. 4, an illustrative embodiment of processor substrate 300 are shown. The integrated circuitry of processor substrate 300 includes a host processor 400 and a cryptographic device 410. To enable communications with host processor 400, in this embodiment, cryptographic device 410 is connected to host processor 400 through a dedicated processor bus 420. Herein, cryptographic device 410 is arranged to function as a co-processor. It is contemplated, however, that cryptographic device 410 may be connected to host bus 140 or bus 160 of FIG. 1 in lieu of dedicated processor bus 420, in which case, cryptographic device 410 would not be placed in processing unit 110. Instead, it may be mounted on system substrate 210 as an independent device or on a daughter card (not shown).

Of course, there exist many other embodiments which, although slightly different in design, do not deviate from the spirit and scope of the invention. For example, processing unit 110 may simply include a microprocessor which is mounted onto system substrate 210 along with chipset 130 and cryptographic device 410 of FIG. 4.

Figure 5:
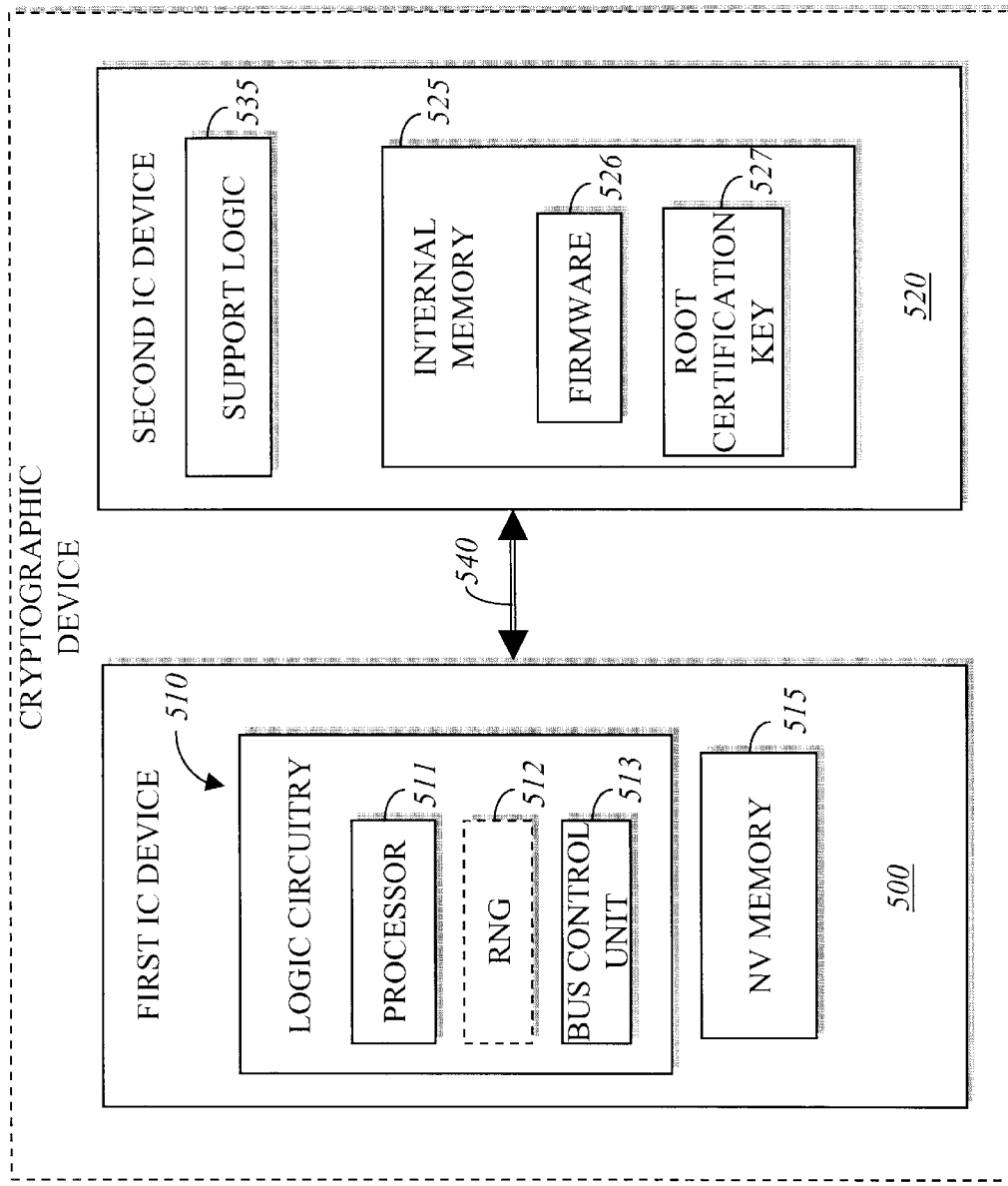
FIG. 5 is an illustrative block diagram of an embodiment of the cryptographic device placed by the processing unit of FIG. 4.

As further shown in FIG. 5, one embodiment of cryptographic device 410 comprises a first integrated circuit (IC) device 500 and a second IC device 520 connected by an internal bus 540. In one embodiment, the IC devices 500 and 520 are implemented within a single multi-chip package. Alternatively, IC devices 500 and 520 may be implemented as separate packaged IC devices.

Herein, second IC device 520 includes internal memory 525 and a small amount of support logic 535. Support logic 535 includes interface circuitry to handle information received from and routed to first IC device 500. Optionally, support logic 535 can include a cryptographic engine which is used by cryptographic device 410 to assist in performing various cryptographic operations in accordance with either symmetric key cryptography or asymmetric key cryptography. The cryptographic engine would operate as either a symmetric (e.g., DES-based) encryption/decryption unit or an asymmetric (e.g., RSA-based) encryption/decryption unit.

As shown, in this embodiment, internal memory 525 includes nonvolatile (NV) memory such as, for example, read only memory (ROM), erasable programmable read-only memory (EPROM), electrically erasable programmable read-only memory (EEPROM) or flash memory. Internal memory 525 contains firmware 526 which is a small computer program executed by first IC device 500 for initialization and authentication purposes in order to ensure that the firmware in storage element $170_1$ of FIG. 1 has not been tampered with or corrupted. Internal memory 525 further contains a public key 527 of a certification authority of the cryptographic device 410 of FIG. 4 (hereinafter referred to as a "root certification key"). It is contemplated that root certification key 527 may be a public key of an OEM of the cryptographic device or a key assigned to another type of entity (e.g., trade association, governmental entity, bank, etc.) if that entity digitally signed BIOS certificate 181 of FIG. 1. The root certification key 527 is needed for certificate verification purposes.

Referring still to FIG. 5, first IC device 500 is logic circuitry 510 including a small amount of non-volatile memory 515. Logic circuitry 510 includes a processor 511, an optional random number generator 512 (as denoted by dashed lines) and a bus control unit 513. If implemented, random number generator 512 would generate the initial values used to produce key(s) contained within cryptographic device 410. The bus control unit 513 provides an interface to control the transfer of information between cryptographic device 410 and host processor 400 of FIG. 4 through dedicated processor bus 420.

Figure 6A:
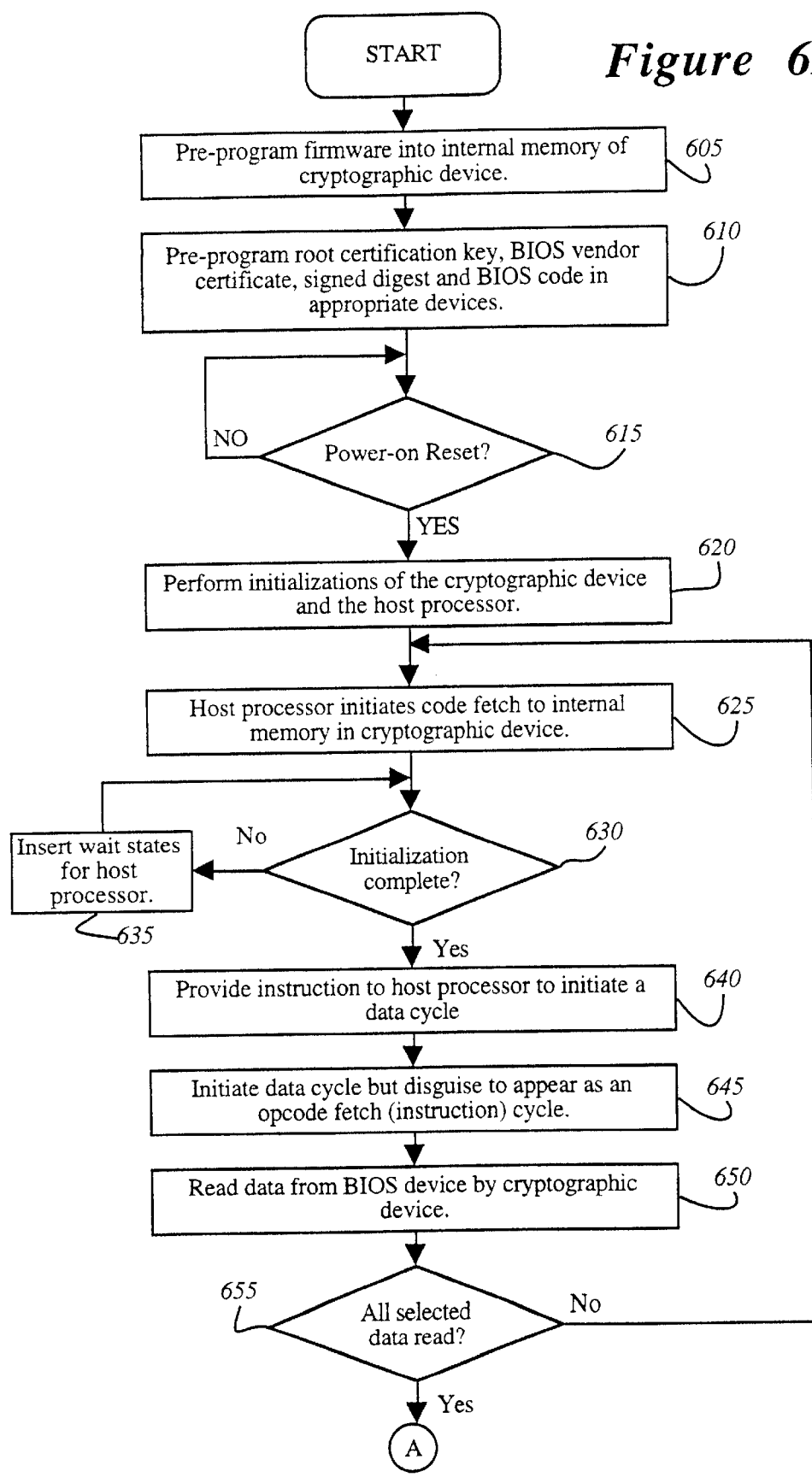
FIGS. 6A and 6B are an illustrative embodiment of cryptographic operations, performed by the cryptographic device, host processor and nonvolatile memory containing the BIOS code, in authenticating the BIOS code before its execution during the boot procedure.
Figure 6B:
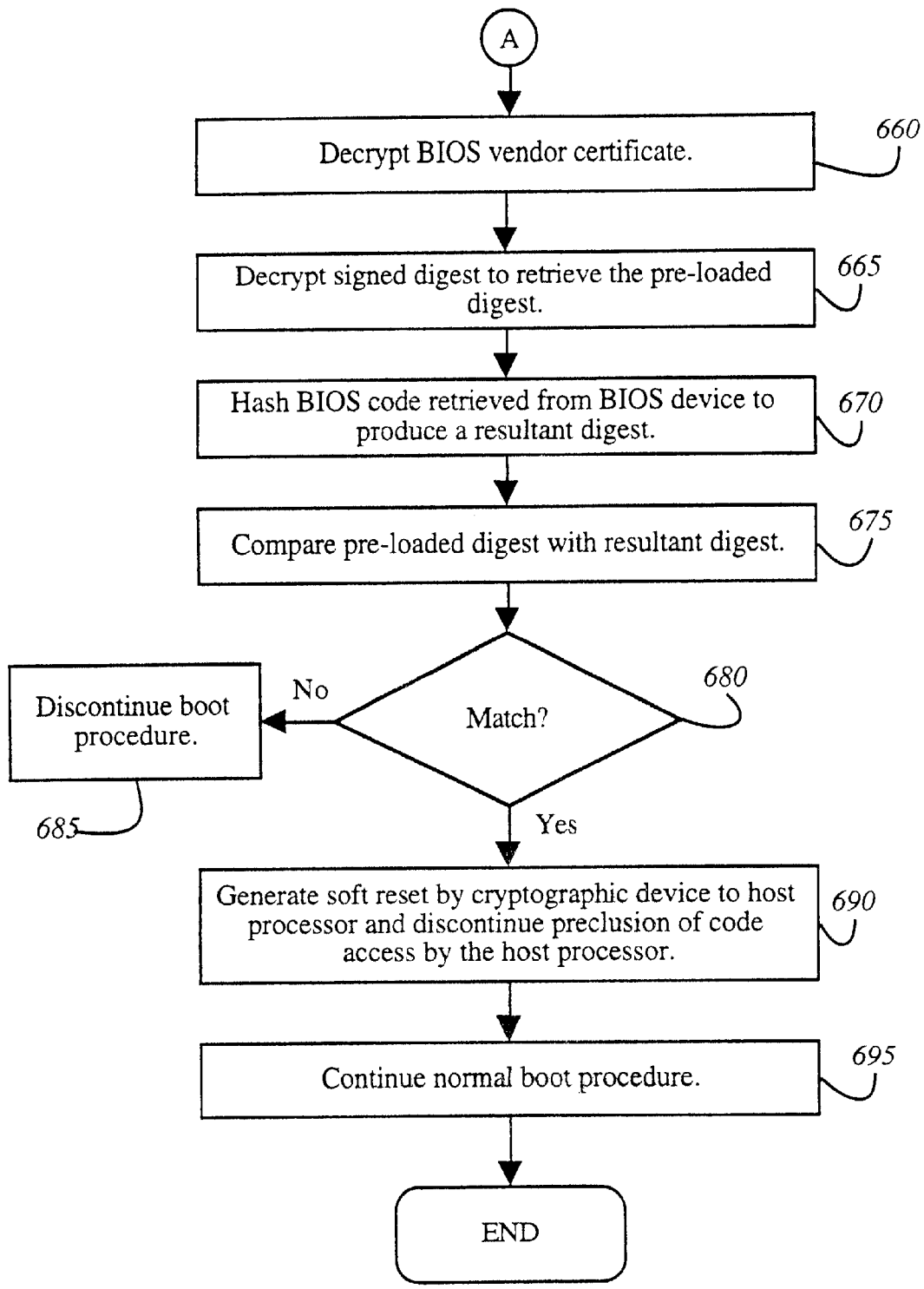

Referring now to FIGS. 6A and 6B, a flowchart is provided which illustrates the operations of an embodiment of the electronic system used for verification of BIOS code to determine whether the BIOS code has been illicitly modified. If so, execution by the host processor is prevented.

As shown in blocks 605 and 610, firmware and the root certification key are initially pre-programmed into internal memory of the cryptographic device (FIG. 5) during manufacture. The firmware continues execution, including responses to instruction fetches by the host processor, after a power-on system reset in order to retrieve contents from a storage element (e.g., BIOS code) for authentication purposes.

In response to a power-on system reset (block 615), both the host processor and the cryptographic device begin their respective internal initialization (block 620). Each hardware device begins execution of internally stored microcode. After completion of its internal initialization, the host processor initiates an instruction fetch to a predetermined address that is mapped to the address range of internal memory of the cryptographic device (block 625). If the cryptographic device has not completed its internal initialization, the instruction fetch by the host processor is delayed by the cryptographic device until its internal initialization has completed (blocks 630 and 635). A technique for delaying access by the host processor includes transmission of a JUMP-to-SELF instruction back to the host processor, or insertion of wait states as shown.

Upon completing a successful internal initialization, the cryptographic device responds to the instruction fetch with a first instruction, typically a MOV instruction, from the predetermined memory location in its internal memory 525 (block 640). The MOV instruction includes, as an operand, an address falling in an address range of a legacy platform BIOS device (storage device 170$_1$ of FIG. 1). Upon receiving the MOV instruction, the host processor initiates a data read cycle on a front side bus with the memory address of the BIOS device provided with the MOV instruction from the cryptographic device (block 645).

In order to maintain compatibility with legacy memory controller hub and I/O controller hub devices, this data cycle is configured to appear as an instruction fetch cycle. This is accomplished by placing the host processor into a CHECK mode by setting an opcode fetch emulation bit. Herein, the architecture of the host processor includes the opcode fetch emulation bit that defaults to a "SET" state after a power-on reset. Upon detecting that the opcode fetch emulation bit is set, the host processor deasserts a data/control (D/C#) control line so that the data fetch appears to the chipset as an instruction fetch.

In block 650, the bytes read from the BIOS device are then transferred to the cryptographic device. The acts performed in blocks 640-650 are part of an iterative process which continues until the BIOS code, BIOS certificate and BIOS signature are retrieved from the BIOS device (block 655) under control of further instructions provided to the host processor by the cryptographic device. As a result, during this iterative process, the host processor temporarily operates effectively as a Direct Memory Access (DMA) device between the BIOS device and the cryptographic device.

Concurrent or subsequent to this data transfer, within the cryptographic device, the BIOS certificate is decrypted using the root certification key (block 660). This operation is performed to retrieve a public key of the signatory of the BIOS signature (e.g., BIOS vendor). Then, the preloaded digest signature is decrypted using the public key of the BIOS vendor, for example, to recover a pre-loaded digest (block 665). After recovering the pre-loaded digest, the BIOS code is read and undergoes the one-way hash function to produce a resultant digest (block 670). The resultant digest is compared to the pre-loaded digest (block 675). If no match occurs, the host processor is precluded from continuing its boot procedure (blocks 680 and 685). However, if there is a match, the BIOS code has been authenticated as valid.

As an alternative, it is contemplated that the pre-loaded digest may be a one-way hash of a portion of the BIOS code. Then, only a predetermined portion of the BIOS code needs to be read into the cryptographic device. However, this technique may be less secure than the technique discussed above.

Once the BIOS code has been authenticated, the cryptographic device generates a soft reset to the host processor (block 690). In this embodiment, the soft reset may occur through activation of a predetermined signal line. This soft reset causes the opcode fetch emulation bit to be reset, which signals the host processor to begin execution at the standard legacy reset vector to fetch its first instruction from the BIOS device to perform a normal boot procedure. In lieu of using signal line(s), as an alternative, successive software instructions may be used to reset the opcode fetch emulation bit and to jump to a particular address for the legacy reset vector.

After the opcode fetch emulation bit has been reset and execution of the legacy reset vector begins, the electronic system continues its normal boot procedure (block 695). An optional user authentication procedure may now be performed because the BIOS code has been authenticated.

In summary, the above-described operations require only slight changes in the host processor architecture by inclusion of new initial instruction fetches to a predetermined address in the address range of internal memory within the cryptographic device, an optional implementation of an opcode fetch emulation bit to signal emulation of an instruction fetch when a data fetch is being performed by the host processor, and a soft reset. As a result, this architecture and procedure maintain backward compatibility with conventional electronic systems.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
   a chipset including a controller;
   a storage device coupled to the chipset and controlled by the memory controller, the storage device including software code, a digital signature of the software code, and a digital certificate pre-stored within the storage device;
   a processor coupled to the chipset via a data/control control line, the processor including an opcode fetch emulation bit, the opcode fetch emulation bit to default to a predetermined state during a power-on reset condition and cause the processor to disguise a data fetch to the storage device as an instruction fetch through deassertion of the data/control control line so that the data fetch appears as an instruction fetch to the controller; and a cryptographic device in communication with the processor, the cryptographic device to authenticate the software code, loaded into the cryptographic device during a boot procedure, before permitting the processor to execute the software code.

2. The system of claim 1, wherein the software code includes a basic input output system (BIOS) code.

3. The system of claim 2, wherein the digital signature includes a digest of the BIOS code signed by a private key of a vendor of the BIOS code.

4. The system of claim 3, wherein the digital certificate includes a public key of the vendor of the BIOS code signed by a private key of a certification authority.

5. The system of claim 1, wherein the controller includes one of a legacy memory control hub device and a legacy input/output controller hub device.

6. The system of claim 1, wherein the processor and the cryptographic device are mounted on a processor substrate including an in-line connector.

7. The system of claim 1, wherein the cryptographic device is connected to the processor through a dedicated bus.

8. The system of claim 1, wherein during a power-on reset condition, the processor initiates an instruction fetch to a predetermined address in an internal memory of the cryptographic device.

9. The system of claim 8, wherein the cryptographic device responding to the instruction fetch by returning an instruction to the processor, the instruction preventing access to contents of the cryptographic device until the cryptographic device has been initialized.

10. The system of claim 8, wherein the cryptographic device responding to the instruction fetch by returning an instruction to the processor, the instruction prompting the processor to initiate a data read cycle to the storage device.

11. The system of claim 4, wherein the cryptographic device generates and transmits a soft reset to the processor after the BIOS code has been authenticated through use of the digital certificate and the digital signature.

12. A cryptographic device comprising:

a first integrated circuit device including a cryptographic engine and a memory to contain firmware and a root certification key; and a second integrated circuit device including logic circuitry to execute firmware to authenticate retrieved basic input/output system (BIOS) code loaded into the first integrated circuit device along with a BIOS signature and a BIOS certificate before permitting execution of the BIOS code during a standard boot procedure.

13. The cryptographic device of claim 12, wherein the cryptographic engine to perform decryption operations on received, encrypted information.

14. The cryptographic device of claim 12, wherein the second integrated circuit device responding to an instruction fetch by returning an instruction which prevents access to contents of the cryptographic device until internal initialization of the cryptographic device has completed.

15. The cryptographic device of claim 12, wherein the cryptographic device responding to an instruction fetch by returning an instruction to a processor, the instruction causing the processor to initiate a data read cycle to a remote storage device.

16. A method comprising:

performing an instruction fetch to an address mapped to an internal memory of a cryptographic device during a power-on reset, the instruction fetch to occur before a boot procedure;

authenticating a basic input output system (BIOS) code during the power-on reset before permitting the BIOS code to be executed, the authenticating of the BIOS code includes initiating a data cycle to fetch the BIOS code and disguising a data fetch over the data cycle as an instruction fetch so that the data fetch appears as the instruction fetch to a controller of an electronic system employing the cryptographic device; and generating a soft reset by the cryptographic device to enable the boot procedure to proceed.

17. The method of claim 16, wherein the initiating the data cycle further fetches a BIOS certificate.

18. The method of claim 17, wherein the initiating the data cycle further fetches a BIOS signature.

19. The method of claim 18, wherein the authenticating of the BIOS code includes hashing the BIOS to produce a resultant digest, recovering a pre-loaded digest from the BIOS signature after recovering a public key of a signatory of the BIOS signature from the BIOS certificate and comparing the resultant digest to the pre-loaded digest.

* * * * *